(12) United States Patent
Sanagi et al.

(10) Patent No.: US 6,481,311 B1
(45) Date of Patent: Nov. 19, 2002

(54) PEDAL ASSEMBLY SUPPORTING STRUCTURE FOR AUTOMOBILE

(76) Inventors: Shuji Sanagi, c/o Mazda Motor Corporation, 3-1, Shinchi, Fuchu-cho, Aki-gun, Hiroshima 735-8670 (JP); Kouki Makino, c/o Mazda Motor Corporation, 3-1, Shinchi, Fuchu-cho, Aki-gun, Hiroshima 735-8670 (JP); Keisuke Miyoshi, c/o Mazda Motor Corporation, 3-1, Shinchi, Fuchu-cho, Aki-gun, Hiroshima 735-8670 (JP); Kazunori Tomono, c/o Mazda Motor Corporation, 3-1, Shinchi, Fuchu-cho, Aki-gun, Hiroshima 735-8670 (JP); Hideaki Tanaka, c/o Mazda Motor Corporation, 3-1, Shinchi, Fuchu-cho, Aki-gun, Hiroshima 735-8670 (JP); Kazutaka Ishikura, c/o Mazda Motor Corporation, 3-1, Shinchi, Fuchu-cho, Aki-gun, Hiroshima 735-8670 (JP)

( * ) Notice: Subject to any disclaimer, the term of this patent is extended or adjusted under 35 U.S.C. 154(b) by 9 days.

(21) Appl. No.: 09/722,000

(22) Filed: Nov. 27, 2000

(30) Foreign Application Priority Data

Dec. 1, 1999 (JP) .......................................... 11-341814

(51) Int. Cl.$^7$ ................................................. G05G 1/14
(52) U.S. Cl. ............................. 74/512; 74/513; 74/478
(58) Field of Search ............................ 74/512, 513, 478

(56) References Cited

U.S. PATENT DOCUMENTS

| | | | | |
|---|---|---|---|---|
| 5,531,135 A | * | 7/1996 | Dolla | 74/512 |
| 5,921,144 A | * | 7/1999 | Williams et al. | 180/271 |
| 6,041,674 A | | 3/2000 | Kato | |
| 6,101,894 A | * | 8/2000 | Tiemann et al. | 74/512 |
| 6,112,616 A | * | 9/2000 | Schonlau et al. | 180/274 |
| 6,209,416 B1 | * | 4/2001 | Tiemann et al. | 74/512 |
| 6,305,239 B1 | * | 10/2001 | Johansson et al. | 180/334 |
| 6,336,376 B1 | * | 1/2002 | Lee | 180/274 |
| 6,339,971 B1 | * | 1/2002 | Kato | 180/274 |

FOREIGN PATENT DOCUMENTS

| | | |
|---|---|---|
| DE | 197 57 832 | 7/1998 |
| EP | 0 803 420 | 10/1997 |
| EP | 0 805 080 | 11/1997 |
| EP | 0 810 124 | 12/1997 |
| JP | 9-216528 | 8/1997 |

OTHER PUBLICATIONS

European Search Report, Application No. 00125582.7–1264 Jun. 12, 2001.

* cited by examiner

Primary Examiner—David A. Bucci
Assistant Examiner—Julie K. Smith
(74) Attorney, Agent, or Firm—Nixon Peabody LLP; Donald R. Studebaker; Todd A. Vaughn

(57) ABSTRACT

In a supporting structure for a brake pedal assembly pivotally mounted for rocking motion on the rear surface of a dash panel of an automobile through a first bracket, a front portion of the first bracket is fixed to the dash panel and a rear-end upper portion thereof is coupled to a second bracket fastened to an instrument panel member as a car body member in a cabin so as to be disengageable by the application of a load of automobile collision above a predetermined level. The brake pedal assembly is pivotally mounted for rocking motion to the first bracket. On the underside of the second bracket, an inclined guide surface is provided which abuts against the upper end of the brake pedal assembly when the coupling between the first and second brackets is disengaged in an automobile collision so that the first bracket moves backward together with the brake pedal assembly. The inclined guide surface guides the brake pedal assembly in its downward movement through its abutment against the inclined guide surface. This ensures to prevent the brake pedal assembly from moving backward in an automobile collision while providing a simple and highly reliable structure.

5 Claims, 1 Drawing Sheet

PEDAL ASSEMBLY SUPPORTING STRUCTURE FOR AUTOMOBILE

FIELD OF THE INVENTION

This invention relates to a supporting structure for a pedal assembly for use with an automobile.

DESCRIPTION OF THE PRIOR ART

In automobile collisions (head-on collisions), as is often the case, an automobile cannot fully be stopped even though the driver brakes the automobile by stepping on a brake pedal for the purpose of avoidance of a collision, resulting in the collision, namely, the automobile leads to the collision with the brake pedal trod.

In such a case, a front car body goes to collapse while absorbing energy of the collision, and an engine placed in an engine room goes backward while pushing a master cylinder of a brake system located to the rear of the engine. During the time, since a brake pedal lever located to the rear of a dash panel is connected to the master cylinder through an operating rod, the brake pedal is also pushed backward through the operating rod with the backward movement of the master cylinder. As a result, a load of automobile collision acts on the driver's foot with which the driver has stepped on the brake pedal until immediately before the collision to produce a large kick back, thereby applying an impact to the driver's knee.

To cope with this problem, various countermeasures have been conventionally proposed. For example, in a structure disclosed in Japanese Unexamined Patent Publication No. 9-216528, a rocking link is supported to a pedal bracket fixed to a dash panel through a fixed pin extending widthwise of an automobile for rocking motion around the fixed pin, and a brake pedal lever is connected and supported to the rocking link through a rotating pin extending therefrom widthwise of the automobile. And, a spring is bridged between the rocking link and an instrument panel member as a car body member located in a cabin so as to pass above the fixed pin and urge the rocking link into backward rocking motion. Furthermore, an abutment is provided for abutting against the rocking link having moved backward together with the pedal bracket by a collision. When the pedal bracket moves backward by the collision, the rocking link as a support member for the brake pedal ever abuts against the abutment of the instrument panel member and then drops out of the abutment while rocking frontward. In this manner, a brake pedal at the lower end of the brake pedal lever is held against backward movement, thereby preventing a load of automobile collision from being applied to the driver's knee through the brake pedal.

In the conventional structure mentioned above, however, it is necessary to additionally provide the abutment as an in-cabin car body member which can abut against the rocking link. Further, the spring for urging the rocking link into rocking motion must be disposed. These additional members involve complicated structure and high price.

Furthermore, it is difficult for the rocking link to precisely abut against the abutment and drop out of the abutment while rocking frontward in an automobile collision. Therefore, the conventional structure lacks the reliability of the above behavior.

An object of the present invention is to improve the supporting structure for a pedal assembly such as a brake pedal assembly disposed to the rear of a dash panel, and more specifically to reinforce, simplify and lighten the pedal assembly supporting structure for use with an automobile while preventing the pedal as far as possible from moving backward in an automobile collision.

SUMMARY OF THE INVENTION

To attain the above object, in the present invention, a first bracket pivotally mounting a pedal lever is disengageably connected to a second bracket fixed to a car body member in a cabin so that when a load of automobile collision above a predetermined level is applied to the first bracket in an automobile collision, the first bracket is disconnected from the second bracket to come into a cantilevered condition and the upper end of the pedal lever moves downward along an inclined guide surface of the second bracket while downturning the first bracket. This prevents the pedal from moving backward.

More specifically, the present invention is directed to a supporting structure for a pedal assembly disposed to the rear of a dash panel of an automobile. This structure includes a first bracket fixed to the dash panel, a second bracket fixed to a car body member in a cabin and connected to a rear portion of the first bracket so as to be disengageable by a load of automobile collision above a predetermined level, and the pedal assembly pivotally mounted for rocking motion to the first bracket. Further, the second bracket is provided with an inclined guide surface for abutting against an upper end of the pedal assembly moving backward by an automobile collision to guide the pedal assembly downward.

With the above structure, the first bracket pivotally mounting the pedal assembly is supported at its front-end lower portion to the dash panel and connected at its rear-end upper portion to the second bracket, and the second bracket is fixed to the car body member in the cabin. Therefore, in a normal condition, the pedal assembly is supported to the first bracket while holding a unitary relationship with the second bracket.

In contrast, when a load of automobile collision above a predetermined level is applied to the car body in an automobile collision, an engine of the automobile is pushed backward by the load of automobile collision thereby moving the dash panel, a cylinder and the like backward. The first bracket fixed to the dash panel is also moved backward so that the first bracket is disconnected from the second bracket. In this case, since the second bracket is provided with the inclined guide surface for guiding downward movement of the pedal assembly pivotally mounted to the first bracket, when the first bracket is disengaged from the second bracket and starts backward movement, the pedal assembly pivotally mounted to the first bracket abuts at its upper end against the inclined guide surface so that the pedal assembly is guided to move downward along the inclined guide surface. During the time, since the rear portion of the first bracket is pushed downward while moving backward with the progress of deformation of the dash panel, the entire first bracket is folded and the pedal assembly moves not backward but downward unlike the movement of the first bracket. Accordingly, it can be prevented that the load of automobile collision acts on the driver's knee with which the driver steps on the pedal. In addition, since the rear portion of the first bracket is disengagelably connected to the second bracket, this ensures that the first bracket is disconnected from the second bracket by a load of automobile collision above a predetermined level in a collision. As a result, the pedal assembly can be downwardly guided to prevent an impact from being applied to the driver's knee.

Furthermore, since the inventive pedal assembly supporting structure is such a simple structure that the first bracket is fixed to the dash panel, the pedal assembly is mounted for rocking motion to the first bracket and the rear portion of the first bracket is connected to the second bracket fixed to the car body member in the cabin, the structure can be extremely simplified and reduced in cost, as compared with the conventional structure in which the rocking link supporting the pedal assembly abuts against the abutment of the car body member and thereby rocks.

Preferably, a rod associated with a cylinder located forward of the dash panel is connected to the pedal assembly, and the axial direction of the rod is substantially parallel with a direction of inclination of the inclined guide surface of the second bracket.

With this structure, when the upper end of the pedal assembly abuts against the inclined guide surface of the second bracket and moves backward after the disconnection of the first bracket from the second bracket in an automobile collision, the upper end of the pedal assembly moves backward while keeping a substantially constant distance away from the rod associated with the cylinder. In other words, when a load of automobile collision is applied to the pedal assembly from the rod, the pedal assembly smoothly moves downward along the inclined guide surface without taking an extra load. Accordingly, the above effects can be surely obtained.

A pivot point at which the pedal assembly is pivotally mounted to the first bracket is preferably positioned above a mounting portion of the first bracket in which the dash panel mounts the first bracket. With this structure, a large vertical offset is provided between the pivot point of the pedal assembly and the mounting portion of the first bracket onto the dash panel. This aids in smooth downward movement of the pedal assembly and ease folding of the first bracket in an automobile collision.

The pedal assembly is preferably a brake pedal assembly. In this case, there can be provided a pedal assembly optimally exerting the effects of this invention.

DESCRIPTION OF THE PREFERRED EMBODIMENT

Figure 1:
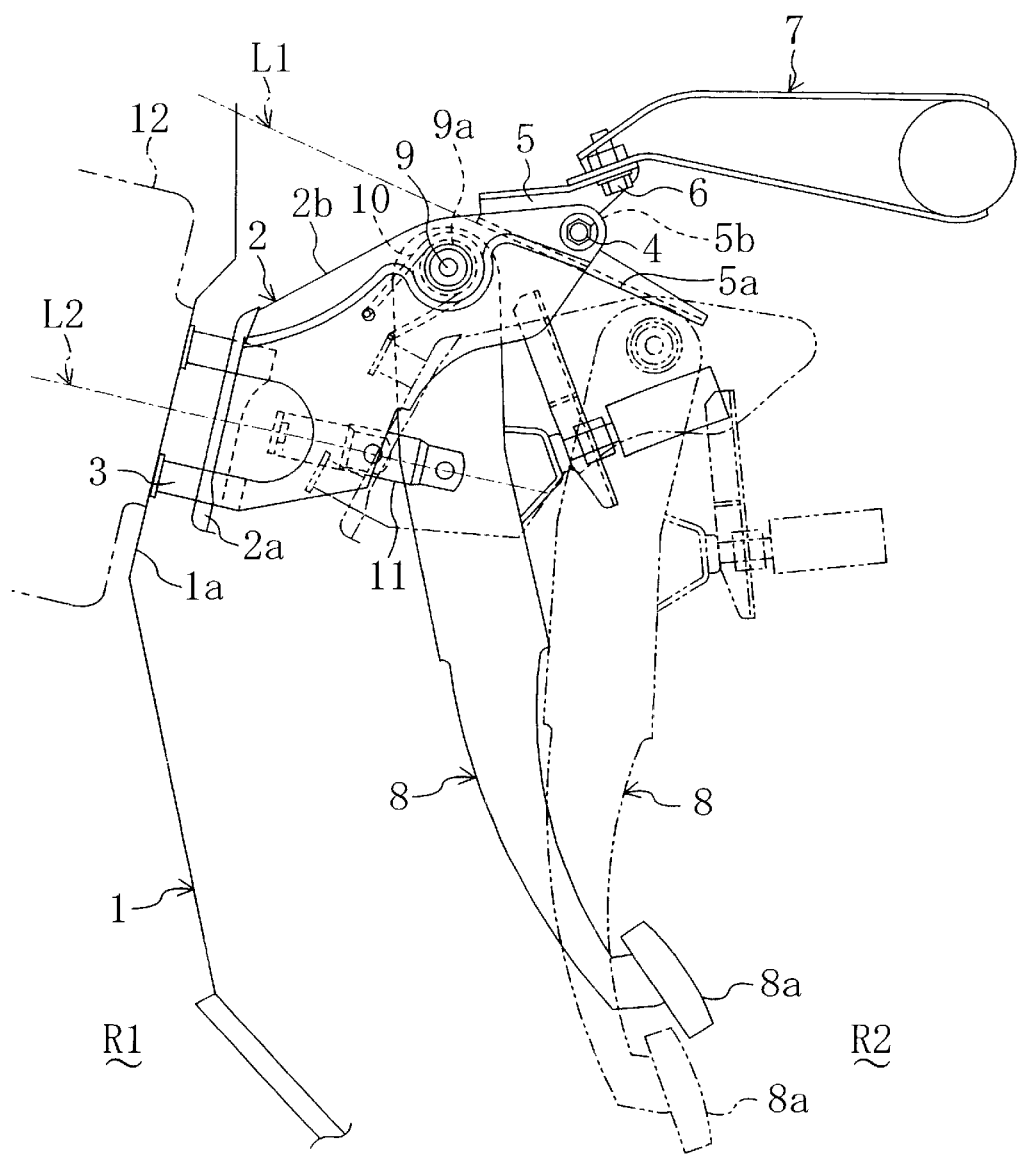
FIG. 1 is aside view showing a pedal assembly supporting structure according to an embodiment of the present invention.

Hereinafter, description will be made about a pedal assembly supporting structure for use with an automobile according to an embodiment of the present invention with reference to the drawing. FIG. 1 shows an entire structure of the embodiment of the present invention. A dash panel 1 constituting part of a car body of an automobile separates an engine room R1, located toward the front thereof (left side of the FIGURE), for accommodating an unshown engine, and a cabin R2 located toward the rear thereof (right side of the FIGURE). A brake pedal assembly 8 operated by a stepping action of a driver seating on a driver's seat (not shown) is disposed to the rear of a lower portion of the dash panel 1, i.e., at the front end of a lower space in the cabin R2.

More specifically, the dash panel 1 is formed with an inclined portion 1a inclining frontward in a direction from top to bottom of the automobile, and a first bracket 2 is fixed to the rear side of the inclined portion 1a with bolts 3, 3 . . .

The first bracket 2 includes a fixing part 2a of rectangular plate shape mounted in parallel relation to the inclined portion 1a of the dash panel and spaced a predetermined distance away therefrom, and a support part 2b of substantially U-shaped section extending upwardly toward the rear from the fixing part 2a. A rear-end upper portion of the support part 2b is coupled to a second bracket 5 described later with a bolt 4. A middle portion of the fixing part 2a is formed with an opening (not shown) in which an operating rod 11 described later is inserted.

A pedal support pin 9 extending laterally (widthwise of the automobile) is bridged between portions of vertical walls of the support part 2b of the first bracket 2 adjacent to the upper end of the support part 2b. The brake pedal assembly 8 is pivotally supported at its upper end to the pedal support pin 9 for rocking motion along a vertical plane. The brake pedal assembly 8 has essentially the shape of an elongated plate and is provided at its lower end with a pedal 8a on which the driver steps.

A pivot point 9a at which the pedal support pin 9 is provided in the first bracket 2 is positioned above the upper end of the fixing part 2a of the first bracket 2 as a mounting portion in which the first bracket 2 is mounted onto the dash panel 1.

A coil spring 10 as a bias means is carried on the pedal support pin 9, anchored at one end thereof to the vertical wall of the support part 2b of the first bracket 2 and anchored at the other end to the brake pedal assembly 8. The coil spring 10 normally urges the brake pedal assembly 8 into rocking motion in a direction to move the pedal 8a toward the rear of the automobile, i.e., counterclockwise in FIG. 1. It goes without saying that any bias means other than the coil spring 10 can be adopted.

An intermediate portion of the brake pedal assembly 8, more specifically, a portion thereof closer to its upper end than its vertically middle portion, is connected to an operating rod 11 (i.e., a rod associated with a master cylinder) which is drivingly connected to the master cylinder (not shown) of the brake system through a master back (serve unit) 12 located at the rear end of the engine room R1. The operating rod 11 passes through the opening of the fixing part 2a of the first bracket 2 and an opening (not shown) formed through the inclined portion 1a of the dash panel 1, and is then connected to the master back 12 located at the rear end of the engine room R1. When the driver steps on the pedal 8a of the brake pedal assembly 8 to rock the brake pedal lever 8 clockwise as viewed in FIG. 1, the operating rod 11 is pushed frontward to operate the master back 12 and the master back 12 thereby boosts a pressing force against the master cylinder. In this manner, the brake is applied by the master cylinder.

An instrument panel member 7 is disposed, as a car body member constituting part of the car body, to the rear of the first bracket 2 and at the front end of the cabin R2 to extend widthwise of the automobile. The instrument panel member 7 has a structure which does not move backward for securing a space for passengers in the cabin R2 in an automobile collision (head-on collision), and a front-end lower portion thereof is fastened to the rear-end upper portion of the second bracket 5 with a bolt 6.

The second bracket 5 is formed of a substantially L-shaped member having a cutaway 5b formed so that a vertically middle portion of the rear end thereof is cut away rearward. The bolt 4 is inserted into the cutaway 5b. The second bracket 5 is connected to the rear portion of the first bracket 2 through the fastening of the bolt 4. And, when a backward load of automobile collision above a predetermined level is applied to the first bracket 2, the bolt 4 unitary with the first bracket 2 drops out of the cutaway 5b of the second bracket 5 so that the first bracket 2 can be disengaged from the second bracket 5. The lower portion of the second bracket 5 is formed with an inclined guide surface 5a. The inclined guide surface 5a is inclined downwardly toward the rear of the automobile, and normally does not abut against the upper end of the brake pedal assembly 8, but abuts against it in an automobile collision to guide the brake pedal assembly 8 downward.

As described so far, the first bracket 2 pivotally mounting the brake pedal assembly 8 is fixed at its front end to the dash panel 1, and the rear-end upper portion of the first bracket 2 is connected to the second bracket 5 fixed to the instrument panel member 7 as a car body member in the cabin. Thus, the brake pedal assembly 8 is constructed so as to be supported to the dash panel 1 and the instrument panel member 7 through the first and second brackets 2 and 5.

The operating rod 11 as a rod associated with the master cylinder is inclined in orthogonal relation with the inclined portion 1a of the dash panel 1, i.e., downwardly toward the rear of the automobile. Further, the direction L1 of inclination of the inclined guide surface 5a of the second bracket 5 is set substantially in parallel with the axial direction L2 of the operating rod 11 associated with the master cylinder.

Next, operations of this embodiment will be described. In a normal automobile condition that the automobile does not cause a collision, as shown in solid lines in FIG. 1 the front end of the first bracket 2 is fixed to the dash panel 1. On the other hand, the rear-end upper portion of the first bracket 2 is integrally connected through the bolt 4 to the second bracket 5 fixed to the instrument panel member 7 as a car body member in the cabin. The brake pedal assembly 8 is pivotally mounted for rocking motion to the rear portion of the first bracket 2. For this structure, when the driver operates the brake pedal assembly 8 by stepping on the brake pedal 8a to brake the automobile, the same behavior as normally performed is exhibited. Specifically, the operating rod 11 advances in response to an operation to step on the brake pedal 8a, and a pressing force of the advancing operating rod 11 is boosted by the master back 12 and then transmitted to the master cylinder. A braking pressure is thereby transmitted from the master cylinder to wheel cylinders (not shown) of wheels to brake the automobile.

In contrast, when the automobile causes a collision (head-on collision) as is in its braked condition that the driver continues to step on the brake pedal 8a, the front car body goes backward to collapse. As a result, the engine in the engine room R1 also goes backward and pushes the master cylinder, the master back 12 and the operating rod 11 to move them backward, and the brake pedal assembly 8 connected in unitary relation with the operating rod 11 thereby also starts a backward movement. Further, the dash panel 1 is also moved backward by taking a load of automobile collision above a predetermined level, and the first bracket 2 fixed to the dash panel 1 moves backward. During the time, the second bracket 5 does not move backward since it is fixed to the instrument panel member 7 as the car body member which can hold a stopping position without moving backward for securing a space for passengers in the cabin R2 in an automobile collision. Accordingly, the backward movement of the first bracket 2 causes the bolt 4 located at the connection between both the brackets 2, 5 to drop out of the cutaway 5b of the second bracket 5 toward the rear so that both the brackets 2, 5 are disengaged from the connection. The first bracket 2 thereby comes into a cantilevered condition where it is supported to the dash panel 1 alone.

The first bracket 2 further moves backward after the disengagement from the second bracket 5. Therefore, the brake pedal assembly 8 pivotally mounted to the first bracket 2 and moving backward together therewith, abuts at its upper end against the inclined guide surface 5a located on the underside of the second bracket 5 and is pushed downward while moving backward along the inclined guide surface 5a. Accordingly, the entire first bracket 2 goes backward while being downturned, and concurrently the upper end of the brake pedal assembly 8 moves downward along the inclined guide surface 5a. As a result, as shown in imaginary lines in FIG. 1, even if the dash panel 1 and the first bracket 2 move backward by a large distance, the brake pedal assembly 8 will not produce the like backward movement. Therefore, a large space for the driver's foot can be secured to avoid a load of automobile collision from acting on the knee of the driver's foot with which the driver has stepped on the brake pedal 8a.

Furthermore, since the direction L1 of inclination of the guide surface of the second bracket 5 is set substantially in parallel with the axial direction L2 of the rod associated with the master cylinder, when the upper end of the brake pedal assembly 8 moves backward while abutting against the inclined guide surface 5a of the second bracket 5 in an automobile collision, the upper end of the brake pedal assembly 8 moves backward while keeping a substantially constant distance away from the operating rod 11. In other words, when a load of automobile collision is applied to the brake pedal assembly 8 from the operating rod 11, the brake pedal assembly 8 smoothly moves downward along the inclined guide surface 5a provided on the second bracket 5 without taking an extra load. In this manner, the brake pedal assembly 8 can be restrained against backward movement in an automobile collision.

Moreover, the pivot point 9a at which the pedal assembly 8 is pivotally mounted to the first bracket 2 is positioned above the upper end of the mounting portion of the first bracket 2 in which the first bracket 2 is mounted to the dash panel 1. With this structure, a large vertical offset is provided between the pivot point 9a of the brake pedal assembly 8 and the upper end of the mounting portion of the first bracket 2 onto the dash panel 1. This aids in smooth downward movement of the brake pedal assembly 8 and ease downturn of the first bracket 2 in an automobile collision.

In addition, this embodiment has such a structure that the front end of the first bracket 2 is fixed to the dash panel 1, the rear-end upper portion of the first bracket 2 is connected to the second bracket 5 fixed to the instrument panel member 7 of the car body and the coupling between both the brackets 2, 5 is disengaged when a load above a predetermined level is applied thereto in an automobile collision. Therefore, the structure of this embodiment exhibits higher operational reliability in an automobile collision as compared with the conventional structure that rocks the rocking link for supporting the brake pedal lever by causing it to abut against the abutment of the instrument panel member. Further, since the structure of this embodiment is far simpler than the conventional structure, it offers price advantage.

Although the pedal assembly used in the above embodiment is the brake pedal assembly 8, any pedal assembly is applicable to this invention so long as it is disposed for rocking motion to the rear of the car dash panel 1 and coupled to the rod 11 associated with a cylinder located forward of the dash panel.

Each mechanism of the first and second brackets 2, 5 is not limited to that as described in the above embodiment, and the essential is that the pedal assembly is adapted to be guided downward along the inclined guide surface of the second bracket in an automobile collision.

What is claimed is:

1. A pedal assembly for connection to a dash panel of an automobile, said pedal assembly comprising:
    a support structure for connecting said pedal assembly to the dash panel, said support structure including:
        a first bracket having a first end and a second end, said first end being fixedly connected to the dash panel;
        a second bracket having a first end fixedly connected to an automobile body member and a second end disengageably connected to said second end of said first bracket; and
        a coupling member for disengageably connecting said second end of said second bracket to said second end of said first bracket, said coupling member being adapted to permit said second bracket to travel a distance less than a distance traveled by said first bracket during a collision of the automobile yet permit said first bracket to disengage from said second bracket upon said first bracket receiving a load above a predetermined level during the collision of the automobile;
    a pedal mechanism including a pedal arm and a pedal member mounted at a distal end of said pedal arm for manipulation by a driver of the automobile, said pedal arm having an upper end pivotally mounted to said first bracket for pivotal motion relative to the dash panel, said pedal arm being located at a distance forward of said coupling member,
    wherein said second bracket includes an inclined guide surface adapted for engagement by an upper end of said pedal arm during a collision of the automobile to guide said pedal mechanism downwardly relative to the dash panel.

2. The pedal assembly as claimed in claim 1, wherein a rod associated with a cylinder located forward of the dash panel is connected to the pedal mechanism, and
    the axial direction of the rod forms a predetermined angle with a direction parallel to a seating face of the second bracket with which the second bracket is mounted to the car body member.

3. The pedal assembly as claimed in claim 1, wherein a pivot point at which the pivot mechanism is pivotally mounted to the first bracket is positioned above a mounting portion of the first bracket in which the dash panel mounts the first bracket.

4. The pedal assembly as claimed in claim 2, wherein a pivot point at which the pivot mechanism is pivotally mounted to the first bracket is positioned above a mounting portion of the first bracket in which the dash panel mounts the first bracket.

5. The pedal assembly as claimed in any one of claims 1 through 4, wherein the pedal mechanism is a brake pedal assembly.

* * * * *